(12) United States Patent
Yang et al.

(10) Patent No.: US 10,182,415 B2
(45) Date of Patent: Jan. 15, 2019

(54) METHOD FOR PROCESSING MESSAGE, NETWORK ELEMENT OF BEARER NETWORK, M2M NODE, SYSTEM AND STORAGE MEDIUMS

(71) Applicant: ZTE Corporation, Shenzhen, Guangdong (CN)

(72) Inventors: Kun Yang, Shenzhen (CN); Hao Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 236 days.

(21) Appl. No.: 15/120,660

(22) PCT Filed: May 15, 2014

(86) PCT No.: PCT/CN2014/077613
§ 371 (c)(1),
(2) Date: Aug. 22, 2016

(87) PCT Pub. No.: WO2015/123926
PCT Pub. Date: Aug. 27, 2015

(65) Prior Publication Data
US 2017/0026932 A1    Jan. 26, 2017

(30) Foreign Application Priority Data

Feb. 24, 2014 (CN) .......................... 2014 1 0063409

(51) Int. Cl.
*H04W 68/00* (2009.01)
*H04W 4/70* (2018.01)
(Continued)

(52) U.S. Cl.
CPC ......... *H04W 68/005* (2013.01); *H04L 67/327* (2013.01); *H04W 4/70* (2018.02); *H04W 12/08* (2013.01); *H04W 88/16* (2013.01)

(58) Field of Classification Search
CPC .... H04L 67/327; H04W 68/005; H04W 4/70; H04W 4/005; H04W 12/08
See application file for complete search history.

(56) References Cited

U.S. PATENT DOCUMENTS

2012/0207094 A1  8/2012  Liao
2014/0045452 A1  2/2014  Ma et al.
(Continued)

FOREIGN PATENT DOCUMENTS

CN    102307348 A    1/2012
CN    102647689 A    8/2012
(Continued)

OTHER PUBLICATIONS

Supplementary European Search Report in European application No. 14882916.1, dated Jan. 11, 2017, 13 pgs.
(Continued)

*Primary Examiner* — Chi H Pham
*Assistant Examiner* — Weibin Huang
(74) *Attorney, Agent, or Firm* — Cooper Legal Group, LLC

(57) ABSTRACT

Disclosed are a method for processing a device trigger message, a network element of a bearer network, an M2M node and a system, which relate to the field of communications. The method comprises: receiving a device trigger authorization request which is sent by a CSE and comprises an identifier of the CSE; according to the device trigger authorization request, sending a device trigger authorization permission to the CSE; receiving a device operation request instruction which is set and sent by the CSE and comprises a device operation attribute value pair; according to the device operation request instruction, conducting an authorization check on the CSE, so as to acquire an internal identifier of a trigger device and routing information there-
(Continued)

about; and according to the internal identifier and the routing information, sending a trigger request message to the trigger device. Also disclosed at the same time are three computer storage mediums.

17 Claims, 5 Drawing Sheets

(51) Int. Cl.
*H04L 29/08* (2006.01)
*H04W 12/08* (2009.01)
*H04W 88/16* (2009.01)

(56) References Cited

U.S. PATENT DOCUMENTS

| | | | |
|---|---|---|---|
| 2014/0185522 A1 | 7/2014 | Xu | |
| 2014/0242952 A1* | 8/2014 | Zhang | H04W 4/70 455/411 |
| 2014/0317195 A1 | 10/2014 | Xu | |
| 2016/0219125 A1* | 7/2016 | Xiao | H04W 4/70 |
| 2017/0026774 A1* | 1/2017 | Koshimizu | H04W 4/70 |

FOREIGN PATENT DOCUMENTS

| | | |
|---|---|---|
| CN | 102958025 A | 3/2013 |
| CN | 103249013 A | 8/2013 |
| CN | 103517230 A | 1/2014 |
| CN | 103581895 A | 2/2014 |
| CN | 104104713 A | 10/2014 |
| WO | 2013061614 A2 | 5/2013 |

OTHER PUBLICATIONS

"3rd Generation Partnership Project; Technical Specification Group Services and System Aspects; Architecture enhancements to facilitate communications with packet data networks and applications", Dec. 13, 2013, 3rd Generation Partnership Project (3GPP),Mobile Competence Centre; 650, Route Des Lucioles ; F-06921 Sophia-Antipolis Cedex ; France, vol. SA WG2, No. V12.0.0,13, 34 pgs.
Rajesh Bhalla et al: "oneM2M Functional Architecture" , Feb. 8, 2014, FUNCTIONAL ARCHITECTURE_ SPEC_TS-0001_V0_4_ 0.ZIP, ONEM2M, vol. WG2—Architecture, ARC Retrieved from the Internet: URL:URL =http://member.onem2m.org/Application/ documentapp/downloadimmediate/derault.aspx?docI D=4723 , 170 pgs.
International Search Report in international application No. PCT/ CN2014/077613, dated Dec. 4, 2014, 2 pgs.
English Translation of the Written Opinion of the International Search Authority in international application No. PCT/CN2014/ 077613, dated Dec. 4, 2014, 8 pgs.

* cited by examiner

METHOD FOR PROCESSING MESSAGE, NETWORK ELEMENT OF BEARER NETWORK, M2M NODE, SYSTEM AND STORAGE MEDIUMS

TECHNICAL FIELD

The disclosure relates to a signalling control technology in the field of communication, and in particular to a message processing method, a network element of a bearer network, a Machine-to-Machine (M2M) node, a system and a computer storage medium.

BACKGROUND

An M2M (Machine-to-Machine) communication network for Machine Type Communication (MTC) consists of a plurality of M2M nodes and a bearer network. The M2M nodes implement communication with each other through the bearer network, and each M2M node at least includes an application or a Common Service Entity (CSE).

M2M nodes can be classified into two types according to different functions: nodes with CSEs and nodes without CSEs. The nodes without CSEs include an application-specific node; and the application-specific node is required to have at least one application, and does not include a CSE; and the nodes with CSEs include an application service node, an intermediate node and an infrastructure node.

The application service node can functionally be required to at least have an application and a CSE, and physically corresponds to a terminal device.

The intermediate node can functionally be required to have at least one CSE, can have at least one application, physically corresponds to a gateway device, and is responsible for managing a terminal device connected to a gateway and managing a connection between a terminal and a service provision server.

The infrastructure node can functionally be required to have at least one CSE, can have at least one application, and physically functions as a service provision server on a network side, for providing management and service support for a terminal device and a gateway device.

A basic configuration of an M2M service provider usually includes: an infrastructure node, a plurality of intermediate nodes and a plurality of service application nodes.

Communication between M2M applications is implemented by interaction between CSEs, the M2M applications are connected to the CSEs through Mca interfaces, the CSEs communicate with each other through Mcc interfaces, the M2M applications can implement communication on the premise of registration with the local CSEs, and then interaction between the M2M applications can be implemented through communication between the CSEs.

When a service layer server is required to communicate with an application on a certain device (an application service node or an application-specific node), the service layer server is required to trigger the device to initiate a connection with the service layer server. The service layer server is required to send such a triggering message through a bearer network.

A Machine-Type communication-InterWorking Function (MTC-IWF), which is an entity connected between a service layer and a bearer network, is capable of realizing functions of protocol translation, address query, information storage and the like. The IWF is externally connected to a service layer server, and can be internally connected to a network element of the bearer network, such as a Home Subscriber Server (HSS) or a Mobility Management Entity (MME).

However, management over device triggering in existing MTC is disordered, which causes low communication reliability.

SUMMARY

In view of this, the embodiment of the disclosure is intended to provide a message processing method, a network element of a bearer network, an M2M node, a system and a storage medium, so as to provide a more ordered device triggering flow to achieve communication reliability.

In order to achieve the purpose, the technical solutions of the embodiment of the disclosure are implemented as follows.

On a first aspect, the embodiment of the disclosure provides a device triggering message processing method, which can include that:

a device triggering authorization request containing an identifier of a CSE is received from the CSE;

a device triggering authorization permission is sent to the CSE according to the device triggering authorization request;

a Device-Action-Request instruction which is set and sent by the CSE and contains a Device-Action Attribute Value Pair (AVP) is received;

authorization checking is performed on the CSE according to the Device-Action-Request instruction, and an internal identifier and routing information of a triggered device are acquired; and a triggering request message is sent to the triggered device according to the internal identifier and the routing information.

Preferably, after the step that the triggering request message is sent to the triggered device according to the internal identifier and the routing information, the method can further include that:

a Device-Notification AVP is set, wherein the Device-Notification AVP can contain a Request-Status AVP; and a Device-Action-Answer instruction containing the Device-Notification AVP is sent to the CSE.

Preferably, after the step that the Device-Action-Answer instruction containing the Device-Notification AVP is sent to the CSE, the method can further include that:

a triggering response which is sent by the triggered device according to the triggering request message is received;

the Device-Notification AVP is set according to the triggering response, the Device-Notification AVP containing a Delivery-Outcome AVP; and a Device-Notification request instruction containing the Device-Notification AVP is sent to the CSE.

Preferably, the step that the Device-Notification AVP is set according to the triggering response can include that:

the triggering response from the triggered device is received within a triggering Validity-Time; and the Delivery-Outcome AVP is set to "unconfirmed" if the triggering response is not received within the triggering Validity-Time.

Preferably, the step that the Device-Notification AVP is set according to the triggering response can further include that:

the Delivery-Outcome AVP is set to "success" if the triggering response is received within the triggering Validity-Time and a delivery status indication in the triggering response is "triggering succeeded".

Preferably, the step that the Device-Notification AVP is set according to the triggering response can further include that:

the triggering request message is resent until triggering succeeds or the triggering Validity-Time has elapsed, if the triggering response is received within the triggering Validity-Time and the delivery status indication in the triggering response is "triggering failed"; and the Delivery-Outcome AVP is set to "failed" when the triggering Validity-Time has elapsed and triggering fails, wherein the Device-Notification AVP can further contain a reason for failure.

Preferably, after the step that the Device-Notification request instruction containing the Device-Notification AVP is sent to the CSE, the method can further include that:

a Device-Notification-Answer instruction sent by the CSE is received, wherein the Device-Notification-Answer instruction can contain the Device-Notification AVP set by the CSE according to the Device-Notification request instruction; and the Device-Notification AVP can contain a Receipt-Outcome AVP.

Preferably, after the step that the Device-Notification-Answer instruction sent by the CSE is received, the method can further include that:

the Device-Action AVP and the Device-Notification AVP are released according to the Device-Notification-Answer instruction.

On a second aspect, the embodiment of the disclosure provides a device triggering message processing method, which can include that:

a device triggering authorization request containing an identifier of a CSE is sent;

a device triggering authorization permission fed back by a network element of a bearer network according to the device triggering authorization request is received;

a Device-Action AVP is set; and a Device-Action-Request instruction containing the Device-Action AVP is sent to the network element of the bearer network.

Preferably, after the step that the Device-Action-Request instruction containing the Device-Action AVP is sent to the network element of the bearer network, the method can further include that:

a Device-Action-Answer instruction containing a Device-Notification AVP is received from the network element of the bearer network, the Device-Notification AVP containing a Request-Status AVP, wherein the Device-Action-Answer instruction can be sent after the network element of the bearer network sends a triggering request message to a triggered device according to the Device-Action-Request instruction.

Preferably, after the step that the Device-Action-Answer instruction containing the Device-Action AVP is sent to the network element of the bearer network, the method can further include that:

a Device-Notification request instruction containing the Device-Notification AVP is received from the network element of the bearer network, the Device-Notification AVP containing a Delivery-Outcome AVP, wherein the Device-Notification request instruction can be sent by the network element of the bearer network according to a triggering response fed back by the triggered device.

Preferably, after the step that the Device-Notification request instruction sent by the network element of the bearer network is received, the method can further include that:

the Device-Notification AVP is set according to the Device-Notification request instruction, the Device-Notification AVP containing a Receipt-Outcome AVP; and the Device-Notification AVP is sent to the network element of the bearer network through a Device-Notification-Answer instruction.

On a third aspect, the embodiment of the disclosure provides a device triggering message processing method, which can include that:

a CSE sends a device triggering authorization request to a network element of a bearer network;

the network element of the bearer network receives the device triggering authorization request;

the network element of the bearer network sends a device triggering authorization permission to the CSE according to the device triggering authorization request;

the CSE sets a Device-Action AVP, and sends a Device-Action-Request instruction containing the Device-Action AVP to the network element of the bearer network;

the network element of the bearer network receives the Device-Action-Request instruction;

the network element of the bearer network performs authorization checking on the CSE according to the Device-Action-Request instruction, and acquires an internal identifier and routing information of a triggered device; and the network element of the bearer network sends a triggering request message to the triggered device according to the internal identifier and the routing information.

Preferably, after the step that the network element of the bearer network sends the triggering request message to the triggered device according to the internal identifier and the routing information, the method can further include that:

the network element of the bearer network sets a Device-Notification AVP, wherein the Device-Notification AVP can contain a Request-Status AVP;

the network element of the bearer network sends a Device-Action-Answer instruction containing the Device-Notification AVP to the CSE; and the CSE receives the Device-Action-Answer instruction.

Preferably, after the step that the network element of the bearer network sends the Device-Action-Answer instruction containing the Device-Notification AVP to the CSE, the method can further include that:

the network element of the bearer network receives a triggering response sent by the triggered device according to the triggering request message;

the network element of the bearer network sets the Device-Notification AVP according to the triggering response, the Device-Notification AVP containing a Delivery-Outcome AVP;

the network element of the bearer network sends a Device-Notification request instruction containing the Device-Notification AVP to the CSE;

the CSE receives the Device-Notification request instruction;

the CSE sets the Device-Notification AVP according to the Device-Notification request instruction, the Device-Notification AVP containing a Receipt-Outcome AVP;

the CSE sends the Device-Notification AVP through a Device-Notification-Answer instruction; and the network element of the bearer network receives the Device-Notification-Answer instruction, and releases the Device-Notification AVP and the Device-Action AVP according to the Device-Notification-Answer instruction.

On a fourth aspect, the embodiment of the disclosure provides a network element of a bearer network, which can include a first receiving unit, a first processing unit and a first sending unit, wherein the first receiving unit can be configured to receive a device triggering authorization request containing an identifier of a CSE from the CSE;

the first processing unit can be configured to send a device triggering authorization permission to the CSE according to the device triggering authorization request;

the first receiving unit can further be configured to receive a Device-Action-Request instruction which is set and sent by the CSE and contains a Device-Action AVP;

the first processing unit can further be configured to perform authorization checking on the CSE according to the Device-Action-Request instruction, and acquire an internal identifier and routing information of a triggered device; and the first sending unit can further be configured to send a triggering request message to the triggered device according to the internal identifier and the routing information.

Preferably, the first processing unit can further be configured to, after the triggering request message is sent to the triggered device according to the internal identifier and the routing information, set a Device-Notification AVP, wherein the Device-Notification AVP can contain a Request-Status AVP; and the first sending unit can further be configured to send a Device-Action-Answer instruction containing the Device-Notification AVP to the CSE.

Preferably, the first receiving unit can further be configured to, after the Device-Action-Answer instruction containing the Device-Notification AVP is sent to the CSE, receive a triggering response sent by the triggered device according to the triggering request message;

the first processing unit can further be configured to set the Device-Notification AVP according to the triggering response, the Device-Notification AVP containing a Delivery-Outcome AVP; and the first sending unit can further be configured to send a Device-Notification request instruction containing the Device-Notification AVP to the CSE.

Preferably, the first receiving unit can further be configured to receive the triggering response from the triggered device within a triggering Validity-Time; and the first processing unit can be configured to set the Delivery-Outcome AVP to "unconfirmed" if the triggering response is not received within the triggering Validity-Time.

Preferably, the first processing unit can further be configured to set the Delivery-Outcome AVP to "success" if the triggering response is received within the triggering Validity-Time and a delivery status indication in the triggering response is "triggering succeeded".

Preferably, the first processing unit can further be configured to resend the triggering request message until triggering succeeds or the triggering Validity-Time has elapsed, if the triggering response is received within the triggering Validity-Time and the delivery status indication in the triggering response is "triggering failed"; and set the Delivery-Outcome AVP to "failed" when the triggering Validity-Time has elapsed and triggering fails, wherein the Device-Notification AVP can further contain a reason for failure.

Preferably, the first receiving unit can further be configured to, after the Device-Notification request instruction containing the Device-Notification AVP is sent to the CSE, receive a Device-Notification-Answer instruction sent by the CSE, wherein the Device-Notification-Answer instruction can contain the Device-Notification AVP set by the CSE according to the Device-Notification request instruction; and the Device-Notification AVP can contain a Receipt-Outcome AVP.

Preferably, the first processing unit can further be configured to, after the Device-Notification-Answer instruction sent by the CSE is received, release the Device-Action AVP and the Device-Notification AVP according to the Device-Notification-Answer instruction.

On a fifth aspect, the embodiment of the disclosure provides an M2M node, which can be a node including a CSE, the M2M node including:

a second sending unit, configured to send a device triggering authorization request containing an identifier of the CSE;

a second receiving unit, configured to receive a device triggering authorization permission fed back by a network element of a bearer network according to the device triggering authorization request;

a second processing unit, configured to set a Device-Action AVP; and the second processing unit being further configured to send a Device-Action-Request instruction containing the Device-Action AVP to the network element of the bearer network.

Preferably, the second receiving unit can further be configured to, after the Device-Action-Request instruction containing the Device-Action AVP is sent to the network element of the bearer network, receive a Device-Action-Answer instruction containing a Device-Notification AVP from the network element of the bearer network, the Device-Notification AVP containing a Request-Status AVP, wherein the Device-Action-Answer instruction can be sent after the network element of the bearer network sends a triggering request message to a triggered device according to the Device-Action-Request instruction.

Preferably, the second receiving unit can further be configured to, after the Device-Action-Answer instruction containing the Device-Action AVP is sent to the network element of the bearer network, receive a Device-Notification request instruction containing the Device-Notification AVP from the network element of the bearer network, the Device-Notification AVP containing a Delivery-Outcome AVP, wherein the Device-Notification request instruction can be sent by the network element of the bearer network according to a triggering response fed back by the triggered device.

Preferably, the second receiving unit can further be configured to, after the Device-Notification request instruction sent by the network element of the bearer network is received, set the Device-Notification AVP according to the Device-Notification request instruction, the Device-Notification AVP containing a Receipt-Outcome AVP; and the second sending unit can further be configured to send the Device-Notification AVP to the network element of the bearer network through a Device-Notification-Answer instruction.

On a sixth aspect, the embodiment of the disclosure provides an M2M communication system, which can include an M2M node and a network element of a bearer network, wherein the M2M node can include an M2M node with a CSE;

the CSE can be configured to send a device triggering authorization request and a Device-Action AVP to the network element of the bearer network, and send a Device-Action-Request instruction containing the Device-Action AVP to the network element of the bearer network; and the network element of the bearer network can be configured to receive the device triggering authorization request, and the network element of the bearer network can send a device triggering authorization permission to the CSE according to the device triggering authorization request, receive the Device-Action-Request instruction, perform authorization checking on the CSE according to the Device-Action-Request instruction, acquire an internal identifier and routing information of a triggered device and send a triggering request message to the triggered device according to the internal identifier and the routing information.

Preferably, the network element of the bearer network can further be configured to, after the network element of the bearer network sends the triggering request message to the triggered device according to the internal identifier and the routing information, set a Device-Notification AVP, the Device-Notification AVP containing a Request-Status AVP, and send a Device-Action-Answer instruction containing the Device-Notification AVP to the CSE; and the CSE can further be configured to receive the Device-Action-Answer instruction.

Preferably, the network element of the bearer network can be configured to, after sending the Device-Action-Answer instruction containing the Device-Notification AVP to the CSE, receive a triggering response sent by the triggered device according to the triggering request message, set the Device-Notification AVP according to the triggering response, the Device-Notification AVP containing a Delivery-Outcome AVP, and send a Device-Notification request instruction containing the Device-Notification AVP to the CSE;

the CSE can further be configured to receive the Device-Notification request instruction, set the Device-Notification AVP according to the Device-Notification request instruction, the Device-Notification AVP containing a Receipt-Outcome AVP, and send the Device-Notification AVP through a Device-Notification-Answer instruction; and the network element of the bearer network can further be configured to receive the Device-Notification-Answer instruction, and release the Device-Notification AVP and the Device-Action AVP according to the Device-Notification-Answer instruction.

On a seventh aspect, the embodiment of the disclosure provides a computer storage medium having stored therein computer-executable instructions for executing the method of any technical solution on the first aspect of the embodiment of the disclosure.

On an eighth aspect, the embodiment of the disclosure provides another computer storage medium having stored therein computer-executable instructions for executing the method of any technical solution on the second aspect of the embodiment of the disclosure.

On a ninth aspect, the embodiment of the disclosure provides another computer storage medium having stored therein computer-executable instructions for executing the method of any technical solution on the third aspect of the embodiment of the disclosure.

According to the device triggering message processing method, network element of the bearer network, M2M node, system and storage medium of the embodiment of the disclosure, a device triggering flow is rearranged by sending the device triggering authorization request, the device triggering authorization permission, the Device-Action-Request instruction and the triggering request message, so that the device triggering flow is clearer and simpler, disorder in device triggering, such as mistaken triggering of unauthorized device, is avoided, and improvement in communication quality is facilitated.

DETAILED DESCRIPTION

Preferred embodiments of the disclosure will be described in detail below with reference to the drawings, and it should be understood that the preferred embodiments described below are only adopted to describe and explain the disclosure and not intended to limit the disclosure.

Embodiment 1

Figure 1:
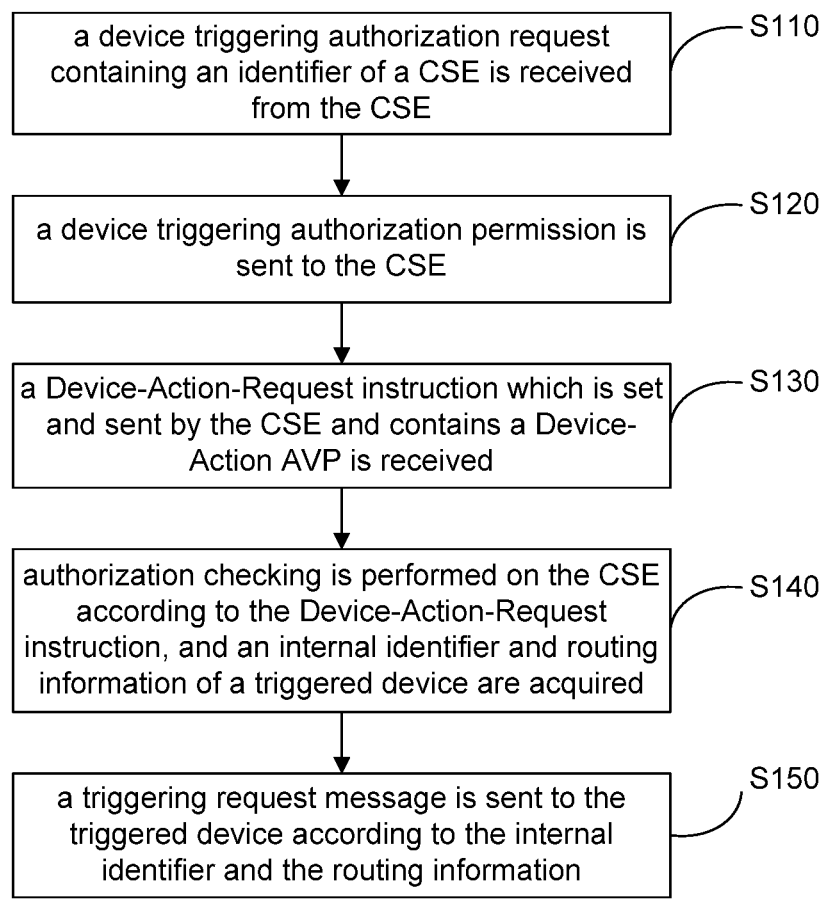
FIG. 1 is a first schematic flowchart of a method according to an embodiment 1 of the disclosure.

As shown in FIG. 1, the embodiment provides a device triggering message processing method, which includes following steps:

Step 110: a device triggering authorization request containing an identifier of a Common Service Entity (CSE) is received from the CSE;

Step 120: a device triggering authorization permission is sent to the CSE according to the device triggering authorization request;

Step 130: a Device-Action-Request instruction which is set and sent by the CSE and contains a Device-Action AVP is received;

Step 140: An authorization checking is performed on the CSE according to the Device-Action-Request instruction, and an internal identifier and routing information of a triggered device are acquired; and Step 150: a triggering request message is sent to the triggered device according to the internal identifier and the routing information.

In the embodiment, an executive subject for performing the Step 110 to Step 150 can be a network element of a bearer network, and the network element of the bearer network can specifically be, for example, a Machine-Type communication-InterWorking Function (MTC-IWF). Specifically, during performing each step, assistances can be offered by one or more other network elements of the bearer network, such as an HSS and/or an MME.

The CSE is a common service entity, and is usually a logic node arranged on a physical device such as a gateway, a server or a terminal. Each CSE corresponds to an identifier which is unique in the whole network, so that different CSEs can be distinguished from each other to facilitate communications. Specifically, the CSE can be a logic entity on a service layer server, and can also be a logic entity located in a terminal device; and the triggered device is a kind of the terminal device.

The authorization permission is sent to the CSE in Step 120, and the authorization permission can contain an authorization permission field, specifically such as information about an authorization permission number and the like. Therefore, the authorization checking can be performed according to information sent by the CSE in Step 140. During specific implementation, the authorization permission can be just an authorization notification. An authorization verification is performed according to the identifier of the CSE in Step 140, and specifically for example, when the identifier of the CSE is stored in an authorization permission table, it is indicated that the CSE is an authorized CSE.

The Device-Action-Request instruction received in Step 130 can contain at least one of:
1) an Action-Type Device-Action Attribute Value Pair (AVP);
2) a Mobile Station International Subscriber Directory Number (MSISDN) AVP or an External-Id AVP set to be the identifier of the triggered device;
3) a CSE identifier AVP;
4) a Reference-Number AVP;
5) a Payload AVP;
6) a Priority-Indication AVP;
7) an Application-Port-Identifier AVP; and
8) a Validity-Time AVP.

In such case, the Action-Type AVP is set to be a device triggering request. The CSE identifier AVP contains the identifier of the CSE requesting for device triggering; the Payload AVP contains a Trigger-Data AVP which is sent to the triggered device by the MTC-IWF through the device triggering request message. The Reference-Number AVP contains a Device-Action Reference-Number newly allocated to the device triggering request by the CSE. The Priority-Indication contains a priority of the triggering request message. The Application-Port-Identifier AVP contains an indication of a triggered application in the triggered device. The Validity-Time AVP is used to indicate a Validity-Time of the device triggering request from the time when the MTC-IWF receives the device triggering request.

The internal identifier and routing information of the triggered device as acquired in Step 140 can be obtained by querying from the Device-Action-Request instruction or querying from a cache of the MTC-IWF.

The triggering request message sent in Step 150 can contain at least one of:
1) an MSISDN or External-Id of the triggered device;
2) the internal identifier of the triggered device;
3) a triggering Reference-Number;
4) the identifier of the CSE;
5) a triggering Payload;
6) the routing information;
7) the Validity-Time;
8) the priority of the triggering request message; and
9) an Application-Port-Identifier.

In such case, the triggering Reference-Number can be the Device-Action Reference-Number allocated to the device triggering request. The Device-Action Reference-Number is used to uniquely identify a triggering request flow, is released when the triggering request is completed, and can specifically be, for example, a preset sequence number.

The triggering Payload can contain the Trigger-Data AVP, the Priority-Indication AVP and the Application-Port-Identifier AVP.

According to the device triggering message processing method of the embodiment, a device triggering flow is standardized by Step 110 to Step 150. As such, the device triggering flow is simpler and clearer. In addition, the problem of poor user experience finally caused by triggering disorder caused by existing disordered triggering is solved.

In order to further optimize the device triggering message processing method of the embodiment, after the network element of the bearer network finishes sending the triggering request message to the triggered device, the method can further includes the following steps.

Step 160: a Device-Notification AVP is set. In such case, the Device-Notification AVP contains a Request-Status AVP, and the Request-Status AVP is used to indicate a status of the device triggering request.

Step 170: a Device-Action-Answer instruction containing the Device-Notification
AVP is sent to the CSE.

Besides the Request-Status AVP, at least one of the followings can further be processed in Step 160:
1) the Action-Type AVP;
2) the Reference-Number AVP;
the Device-Notification AVP can further contains:
3) the MSISDN AVP or the External-Id AVP; and
4) the CSE identifier AVP.

In such case, the Action-Type AVP is set to be the device triggering request. The Reference-Number AVP contains the Device-Action Reference-Number which is received from the CSE and allocated to the device triggering request by the CSE. The MSISDN AVP or the External-Id AVP is set to be the identifier of the triggered device. The CSE identifier AVP contains the identifier of the CSE requesting for device triggering.

In the embodiment, Step 160 and Step 170 are performed by the network element of the bearer network after performing the operation of sending the device triggering request, so that the CSE can judge whether the device triggering request has been sent or not according to a content of the operation response instruction or a Receipt-Outcome of the received operation response instruction when receiving the Device-Action-Answer instruction. Therefore, addition of Step 160 and Step 170 in the embodiment achieves the purpose of sending the triggering request message to the CSE by the network element of the bearer network to enable the CSE to timely learn about a current completion status of the device triggering request.

As a further improvement of the embodiment, after Step 170, the method of the embodiment further includes that:
a triggering response sent by the triggered device according to the triggering request message is received;
the Device-Notification AVP is set according to the triggering response, in which case, the Device-Notification AVP contains a Delivery-Outcome AVP; and
a Device-Notification request instruction containing the Device-Notification AVP is sent to the CSE.

The triggering response contains a delivery status indication; and the delivery status indication indicates whether the device triggering request message is successfully sent or not.

After receiving the triggering response, the network element of the bearer network updates the Device-Notification AVP again, specifically including that the Delivery-Outcome AVP in the Device-Notification AVP is set according to the delivery status indication in the triggering response. In a specific process, several AVPs are collectively called the Device-Notification AVP. After implementing updating of the Device-Notification AVP, the network element of the bearer network notifies the CSE through the Device-Notification request instruction to enable the CSE to timely learn about a current outcome.

The Device-Notification AVP contained in the Device-Notification request instruction can further contain, besides the Delivery-Outcome AVP, any one of:

1) the Action-Type AVP;
2) the MSISDN AVP or the External-Id AVP;
3) the CSE identifier AVP; and
4) the Reference-Number AVP.

In such case, the Action-Type AVP is set to be a sending report. The MSISDN AVP or the External-Id AVP is set to be the identifier of the triggered device. The CSE identifier AVP contains the identifier of the CSE requesting for device triggering. The Reference-Number AVP contains the Reference-Number in a corresponding Device-Action-Request received from the CSE.

Figure 2:
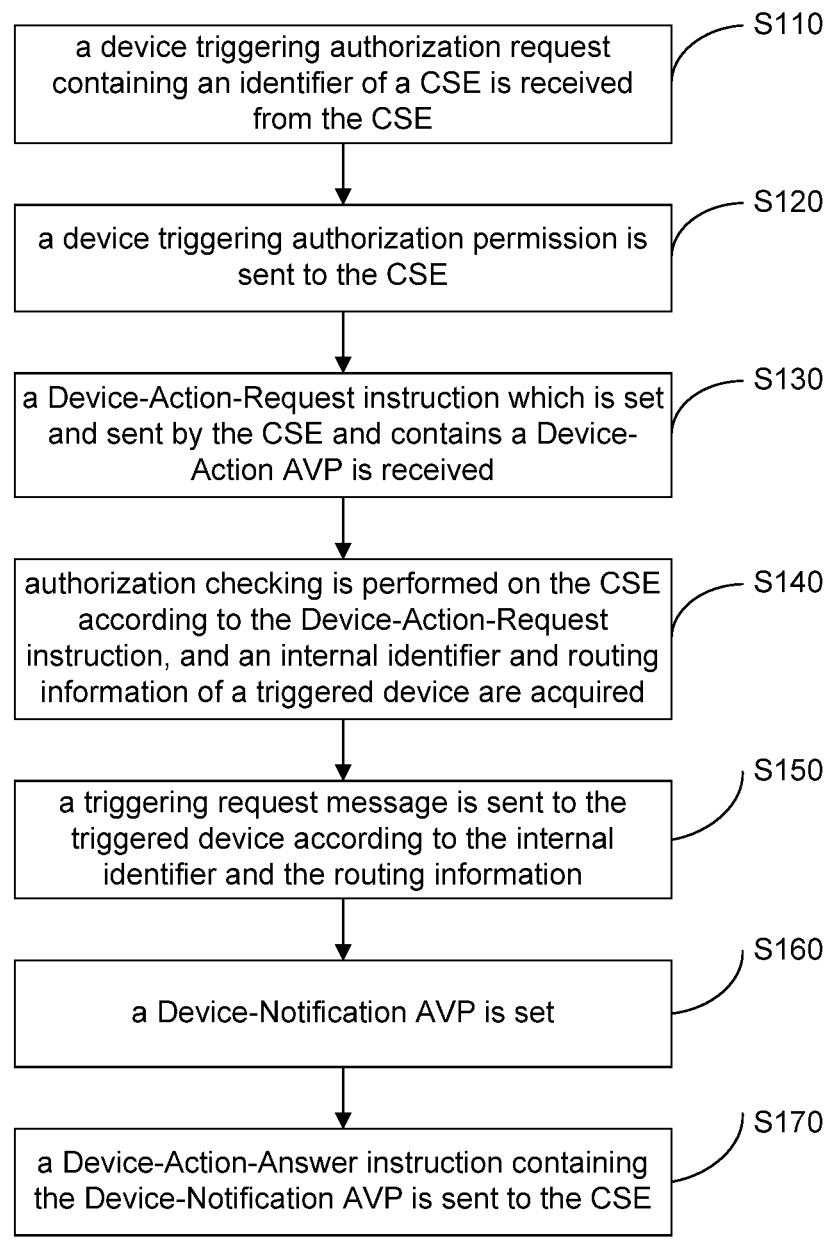
FIG. 2 is a second schematic flowchart of a method according to an embodiment 1 of the disclosure.

In a specific implementation process, as shown in FIG. 2, the device triggering message processing method of the embodiment may not include Step 160 and Step 170, and when the triggering response from the triggered device is received, the Device-Notification request instruction is sent to the CSE.

When an outcome of whether the triggered device receives the triggering request message or not is different, an outcome of the triggering response is different, so that different triggering responses are formed. For different triggering responses, the step that the Device-Notification AVP is set according to the triggering response specifically includes that:

the triggering response from the triggered device is received within a triggering Validity-Time;

the Delivery-Outcome AVP is set to "unconfirmed" if the triggering response is not received within the triggering Validity-Time;

the Delivery-Outcome AVP is set to "success" if the triggering response is received within the triggering Validity-Time and the delivery status indication in the triggering response is "triggering succeeded";

the triggering request message is resent until triggering succeeds or the triggering Validity-Time has elapsed, if the triggering response is received within the triggering Validity-Time and the delivery status indication in the triggering response is "triggering failed"; and the Delivery-Outcome AVP is set to "failed" when the triggering Validity-Time has elapsed and triggering fails.

In such case, the Device-Notification AVP further contains a reason for failure.

The Validity-Time can specifically be a time period, or a time point by which the triggering response should be returned, and many specific implementations can be adopted, and will not be elaborated one by one herein. When the Validity-Time is a time period, a starting time of the time period can be a time point when the triggering request message is sent.

In order to prevent the condition that the received triggering response indicates a "triggering failed", the triggering request message is repeatedly sent, and a maximum sending threshold value can also be set to reduce the amount of information which is sent and the problems of communication congestion and the like caused by repeated sending.

The operation that the triggering request message is resent can specifically include that:

the reason for sending failure is analyzed; and the triggering request message is resent according to the reason for failure and a preset resending strategy. By analyzing the reason for failure, whether the triggering request message can be resent to successfully implement device triggering or not can be judged; and specifically when the reason for failure is network interruption, device triggering can usually not succeed even though the triggering request message is resent, and then the triggering request message may not be resent. The resending strategy can be configured to specify information such as a sending time or a sending path, and specifically for example, a resending time interval is specified, and the same path or a different path are selected to send the triggering request message according to the routing information. The analysis on the reason for failure can determine the reason for failure by methods of automatic network detection and the like, and a specific content can refer to a conventional art, and will not be further described in detail herein.

Preferably, after the step that the Device-Notification request instruction containing the Device-Notification AVP is sent to the CSE, the method further includes that:

a Device-Notification-Answer instruction sent by the CSE is received.

In such case, the Device-Notification-Answer instruction contains the Device-Notification AVP set by the CSE according to the Device-Notification request instruction; and the Device-Notification AVP contains a Receipt-Outcome AVP.

In addition, after the step that the Device-Notification-Answer instruction sent by the CSE is received, the method further includes that:

the Device-Action AVP and the Device-Notification AVP are released according to the Device-Notification-Answer instruction. In a specific implementation process, there is stored the Device-Action AVP or the Device-Notification AVP in a storage medium of the network element of the bearer network or an M2M node after device triggering message processing, and when it is determined that device has been triggered and the CSE has learned about that the device has been triggered, the Device-Action AVP and/or the Device-Notification AVP can be cleared, so that a storage space is saved, and in addition, influence of a previous setting outcome on a Device-Action AVP and/or Device-Notification AVP for latter operation can further be avoided.

From the above, the embodiment provides the device triggering message processing method capable of effectively rationalizing the device triggering flow and solving the problem of poor communication quality caused by disorder in device triggering.

Embodiment 2

Figure 3:
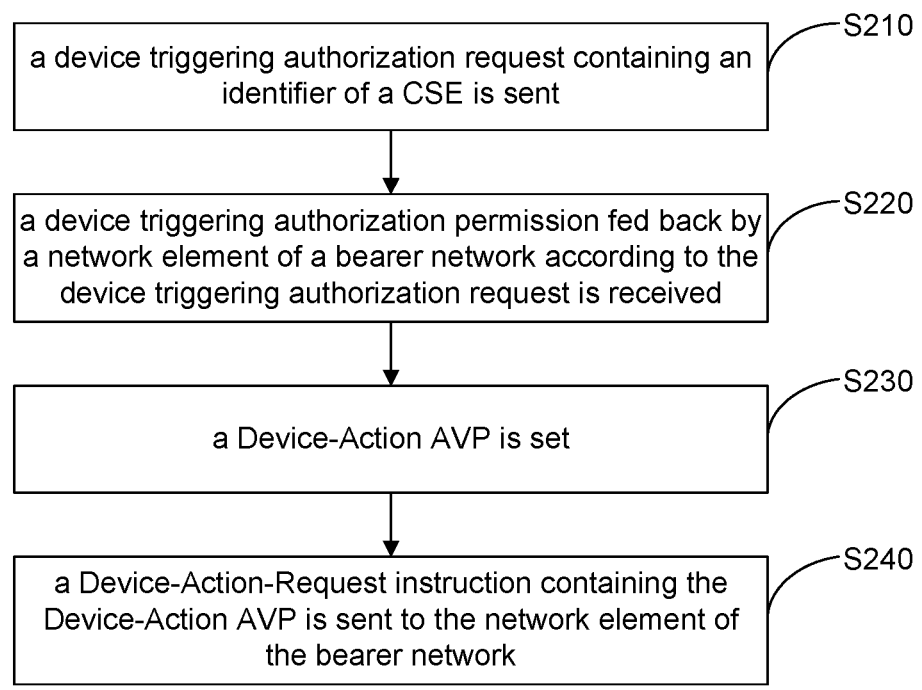
FIG. 3 is a schematic flowchart of a method according to an embodiment 2 of the disclosure.

As shown in FIG. 3, the embodiment provides a device triggering message processing method, which includes:

Step 210: a device triggering authorization request containing an identifier of a CSE is sent;

Step 220: a device triggering authorization permission fed back by a network element of a bearer network according to the device triggering authorization request is received;

Step 230: a Device-Action AVP is set; and

Step 240: a Device-Action-Request instruction containing the Device-Action AVP is sent to the network element of the bearer network.

The device triggering message processing method of the embodiment corresponds to the device triggering message processing method of the embodiment 1, and is described with referenct to the operation performed by the CSE.

In a specific execution process, when receiving the device triggering request sent by an Application Entity (AE), the CSE usually sends the device triggering authorization request.

The authorization permission received in Step 220 can be an authorization notification only, and can also contain an authorization permission number. The authorization notification only notifies that the CSE has been authorized. The authorization permission number may not only notify that the CSE has been authorized. And under the condition that it is necessary to subsequently perform authorization verification, the CSE is required to send the authorization permission number to the network element of the bearer network to facilitate authorization verification.

In such case, the Device-Action AVP set in Step 230 contains at least one of:

1) an Action-Type AVP;
2) an MSISDN AVP or an External-Id AVP set to be an identifier of a triggered device;
3) a CSE identifier AVP;
4) a Reference-Number AVP;
5) a Payload AVP;
6) a Priority-Indication AVP;
7) an Application-Port-Identifier AVP; and
8) a Validity-Time AVP.

In such case, the Action-Type AVP is set to be a device triggering request. The CSE identifier AVP contains the identifier of the CSE requesting for device triggering. The Payload AVP contains a Trigger-Data AVP which is sent to the triggered device by an MTC-IWF through a device triggering request message. The Reference-Number AVP contains a Device-Action Reference-Number newly allocated to the device triggering request by the CSE. The Priority-Indication contains a priority of the triggering request message. The Application-Port-Identifier AVP contains an indication of a triggered application in the triggered device. The Validity-Time AVP is used to indicate a Validity-Time of the triggering request from the time when the MTC-IWF receives the device triggering request.

After the step that the Device-Action-Request instruction containing the Device-Action AVP is sent to the network element of the bearer network, the method further includes that:

a Device-Action-Answer instruction containing a Device-Notification AVP is received from the network element of the bearer network, the Device-Notification AVP containing a Request-Status AVP.

In such case, the Device-Action-Answer instruction is sent after the network element of the bearer network sends the triggering request message to the triggered device according to the Device-Action-Request instruction.

In a specific implementation process, the Device-Action-Answer instruction can further contain, besides the Request-Status AVP, at least one of:

1) the Action-Type AVP;
2) the MSISDN AVP or the External-Id AVP;
3) the CSE identifier AVP; and
4) the Reference-Number AVP.

In such case, the Action-Type AVP is set to be a sending report. The MSISDN AVP or the External-Id AVP is set to be the identifier of the triggered device. The CSE identifier AVP contains the identifier of the CSE requesting for device triggering. The Reference-Number AVP contains the Reference-Number in a corresponding Device-Action-Request received from the CSE.

When the Device-Action-Answer instruction is received, it can be considered that the network element of the bearer network has sent the triggering request message to the triggered device. Specifically, a specific detail as sent can further be determined through a specific content of the Device-Action-Answer instruction.

After the step that the Device-Action-Answer instruction containing the Device-Action AVP is sent to the network element of the bearer network, the method further includes that:

a Device-Notification request instruction containing the Device-Notification AVP is received from the network element of the bearer network, the Device-Notification AVP containing a Delivery-Outcome AVP.

In such case, the Device-Notification request instruction is sent by the network element of the bearer network according to a triggering response fed back by the triggered device.

According to the Device-Notification request instruction, the CSE can learn about whether the triggered device has successfully received the triggering request message or not.

In such case, the Device-Notification AVP contained in the Device-Notification request instruction can further contain, besides the Delivery-Outcome AVP, at least one of:

1) the Action-Type AVP;
2) the MSISDN AVP or the External-Id AVP;
3) the CSE identifier AVP; and
4) the Reference-Number AVP.

In such case, the Action-Type AVP is set to be the sending report. The MSISDN AVP or the External-Id AVP is set to be the identifier of the triggered device. The CSE identifier AVP contains the identifier of the CSE requesting for device triggering. The Reference-Number AVP contains the Reference-Number in a corresponding Device-Action-Request received from the CSE.

After the step that the Device-Notification request instruction sent by the network element of the bearer network is received, the method further includes that:

the Device-Notification AVP is set according to the Device-Notification request instruction, the Device-Notification AVP containing a Receipt-Outcome AVP; and the Device-Notification AVP is sent to the network element of the bearer network through a Device-Notification-Answer instruction.

In order to notify the network element of the bearer network that the CSE has received the Device-Notification request instruction, when the Device-Notification request instruction is received, the CSE return the Device-Notification-Answer instruction containing the Receipt-Outcome AVP to the network element of the bearer network.

From the above, the device triggering message processing method of the present embodiment corresponds to the device triggering message processing method of the embodiment 1, and the advantages of rationalizing device triggering more, lowering a probability of occurrence of a triggering error and the like are also achieved.

Embodiment 3

Figure 4:
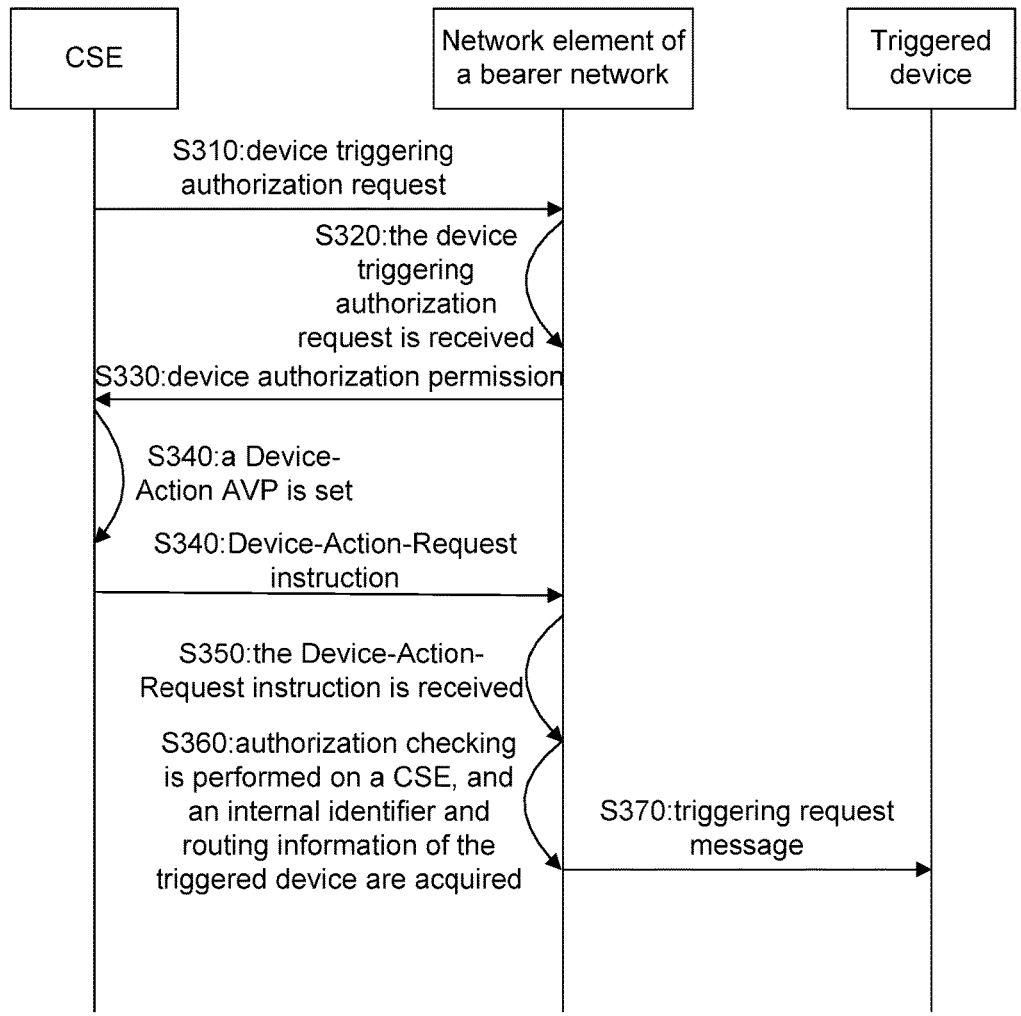
FIG. 4 is a schematic flowchart of a method according to an embodiment 3 of the disclosure.

As shown in FIG. 4, the embodiment provides a device triggering message processing method, which includes the following steps:

Step 310: a CSE sends a device triggering authorization request to a network element of a bearer network;

Step 320: the network element of the bearer network receives the device triggering authorization request;

Step 330: the network element of the bearer network sends a device triggering authorization permission to the CSE according to the device triggering authorization request;

Step 340: the CSE sets a Device-Action AVP, and sends a Device-Action-Request instruction containing the Device-Action AVP to the network element of the bearer network;

Step 350: the network element of the bearer network receives the Device-Action-Request instruction;

Step 360: the network element of the bearer network performs authorization checking on the CSE according to the Device-Action-Request instruction, and acquires an internal identifier and routing information of a triggered device; and Step 370: the network element of the bearer network sends a triggering request message to the triggered device according to the internal identifier and the routing information.

The present embodiment is a combination of the technical solutions of the embodiment 1 and the embodiment 2. The operation performed by the network element of the bearer network in the embodiment can be any technical solution performed by the network element of the bearer network in the embodiment 1, and operation performed by the CSE can be any technical solution performed by the CSE in the embodiment 2. As such, the advantages of avoiding disorder in device triggering in M2M communication and improving communication quality are also achieved.

Preferably, after the step that the network element of the bearer network sends the triggering request message to the triggered device according to the internal identifier and the routing information, the method further includes that:

the network element of the bearer network sets a Device-Notification AVP, in which case, the Device-Notification AVP contains a Request-Status AVP;

the network element of the bearer network sends a Device-Action-Answer instruction containing the Device-Notification AVP to the CSE; and the CSE receives the Device-Action-Answer instruction.

By interaction about the Device-Action-Answer instruction, the CSE can timely learn about whether the triggering request message is timely sent to the triggered device or not.

Preferably, after the step that the network element of the bearer network sends the Device-Action-Answer instruction containing the Device-Notification AVP to the CSE, the method further includes that:

the network element of the bearer network receives a triggering response sent by the triggered device according to the triggering request message;

the network element of the bearer network sets the Device-Notification AVP according to the triggering response, in which case, the Device-Notification AVP contains a Delivery-Outcome AVP;

the network element of the bearer network sends a Device-Notification request instruction containing the Device-Notification AVP to the CSE;

the CSE receives the Device-Notification request instruction;

the CSE sets the Device-Notification AVP according to the Device-Notification request instruction, in which case, the Device-Notification AVP contains a Receipt-Outcome AVP;

the CSE sends the Device-Notification AVP through a Device-Notification-Answer instruction; and the network element of the bearer network receives the Device-Notification-Answer instruction, and releases the Device-Notification AVP and the Device-Action AVP according to the Device-Notification-Answer instruction.

By interaction about the Device-Notification request instruction and the Device-Notification-Answer instruction, both the CSE and the network element of the bearer network can timely learn about a current situation about device triggering to get ready to process information during device triggering and information after triggering.

In a specific implementation process, the Device-Notification request instruction can be directly sent after the network element of the bearer network receives the triggering response from the triggered device.

In the embodiment, specific contents in the triggering request message, the Device-Notification-Answer instruction, the Device-Notification request instruction and the Device-Notification-Answer instruction can refer to the embodiment 1 or the embodiment 2.

Embodiment 4

Figure 5:
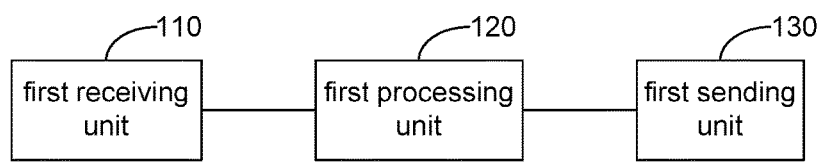
FIG. 5 is a schematic diagram of a structure of a network element of a bearer network according to an embodiment 4 of the disclosure.

As shown in FIG. 5, the present embodiment provides a network element of a bearer network, which includes a first receiving unit 110, a first processing unit 120 and a first sending unit 130.

The first receiving unit 110 is configured to receive from the CSE a device triggering authorization request which contains an identifier of a CSE.

The first processing unit 120 is configured to send a device triggering authorization permission to the CSE according to the device triggering authorization request.

The first receiving unit 110 is further configured to receive a Device-Action-Request instruction which is set and sent by the CSE and contains a Device-Action AVP is received.

The first processing unit 120 is further configured to perform authorization checking on the CSE according to the Device-Action-Request instruction, and acquire an internal identifier and routing information of a triggered device.

The first sending unit 130 is further configured to send a triggering request message to the triggered device according to the internal identifier and the routing information.

A specific structure of the first receiving unit 110 of the embodiment includes a communication interface, specifically for example, an air interface such as a receiving antenna and a wired communication interface such as RJ45, and can be used to receive information from a peripheral device. In a specific implementation process, the CSE and the network element of the bearer network can also be logic network elements integrated to the same M2M communication device, and then the first receiving unit can be formed by a structure such as an internal communication interface or a transmission bus.

A specific structure of the first processing unit 120 can include a processor and a storage medium. And the storage medium includes a transient storage medium such as a Random Access Memory (RAM) used to temporally store data as a cache and the like, and a non-transient storage medium such as a Read-Only Memory (ROM) used to store data for long or permanently. When there is stored a program or software in the non-transient storage medium and the processor runs the program or the software, a function required to be realized by the first processing unit 120 can be realized. The processor can be a central processor, a single-chip microcomputer, a programmable logic array and an electronic device with a processing function. The processor can be connected with the storage medium for data interaction through an address bus and a data bus.

A specific structure of the first sending unit 130 can also include a communication interface, such as a sending antenna.

Specifically, the first processing unit 120 is configured to, after the triggering request message is sent to the triggered device according to the internal identifier and the routing information, set a Device-Notification AVP, in which case, the Device-Notification AVP contain a Request-Status AVP.

The first sending unit 130 is further configured to send a Device-Action-Answer instruction containing the Device-Notification AVP to the CSE.

In addition, the first receiving unit 110 is further configured to, after the Device-Action-Answer instruction containing the Device-Notification AVP is sent to the CSE, receive a triggering response sent by the triggered device according to the triggering request message.

The first processing unit 120 is further configured to set the Device-Notification AVP according to the triggering response, in which case, the Device-Notification AVP contains a Delivery-Outcome AVP.

The first sending unit 130 is further configured to send a Device-Notification request instruction containing the Device-Notification AVP to the CSE.

The first receiving unit 110 is further configured to receive the triggering response from the triggered device within a triggering Validity-Time.

The first processing unit 120 is configured to set the Delivery-Outcome AVP to "unconfirmed" if the triggering response is not received within the triggering Validity-Time, set the Delivery-Outcome AVP to "success" if the triggering response is received within the triggering Validity-Time and a delivery status indication in the triggering response is "triggering succeeded". The first processing unit 120 is configured to resend the triggering request message until triggering succeeds or the triggering Validity-Time has elapsed, if the triggering response is received within the triggering Validity-Time and the delivery status indication in the triggering response is "triggering succeeded".

The first processing unit 120 is configured to set the Delivery-Outcome AVP to "failed" when the triggering Validity-Time has elapsed and triggering fails, in which case, the Device-Notification AVP further contains a reason for failure.

The first receiving unit 110 is further configured to, after the Device-Notification request instruction containing the Device-Notification AVP is sent to the CSE, receive a Device-Notification-Answer instruction sent by the CSE.

In such case, the Device-Notification-Answer instruction contains the Device-Notification AVP set by the CSE according to the Device-Notification request instruction; and the Device-Notification AVP contains a Receipt-Outcome AVP.

The first processing unit 120 is further configured to, after the Device-Notification-Answer instruction sent by the CSE is received, release the Device-Action AVP and the Device-Notification AVP according to the Device-Notification-Answer instruction.

The M2M node of the present embodiment provides physical hardware support for the device triggering message processing method of the embodiment 1, and can be used to implement any technical solution in the embodiment 1. As such, the advantages of avoiding disorder in device triggering, favourably increasing the degree of satisfaction of a user and the like are also achieved.

Embodiment 5

Figure 6:
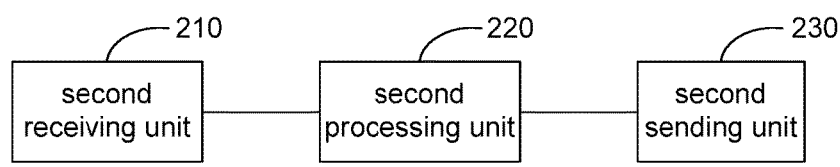
FIG. 6 is a schematic diagram of a structure of an M2M node according to an embodiment 5 of the disclosure.

As shown in FIG. 6, the embodiment provides an M2M node, which is a node including a CSE, the M2M node including:

a second sending unit 230, configured to send a device triggering authorization request containing an identifier of the CSE;

a second receiving unit 210, configured to receive a device triggering authorization permission fed back by a network element of a bearer network according to the device triggering authorization request;

a second processing unit 220, configured to set a Device-Action AVP; and the second processing unit 220 being further configured to send a Device-Action-Request instruction containing the Device-Action AVP to the network element of the bearer network.

A specific structure of the second receiving unit 210 of the present embodiment includes a communication interface, specifically for example, an air interface such as a receiving antenna and a wired communication interface such as RJ45, and can be used to receive information from a peripheral device. In a specific implementation process, the CSE and the network element of the bearer network can also be logic network elements integrated to the same M2M communication device, and then the second receiving unit can be formed by a structure such as an internal communication interface or a transmission bus.

A specific structure of the second processing unit 220 can include a processor and a storage medium. And the storage medium includes a transient storage medium such as a RAM used to temporally store data as a cache and the like, and a non-transient storage medium such as a ROM used to store data for long or permanently. When there is stored a program or software in the non-transient storage medium and the processor runs the program or the software, a function required to be realized by the second processing unit 220 can be realized. The processor can be a central processor, a single-chip microcomputer, a programmable logic array and an electronic device with a processing function. The processor can be connected with the storage medium for data interaction through an address bus and a data bus.

A specific structure of the second sending unit 230 can also include a communication interface, such as a sending antenna.

Preferably, the second receiving unit 210 is further configured to, after the Device-Action-Request instruction containing the Device-Action AVP is sent to the network element of the bearer network, receive a Device-Action-Answer instruction containing a Device-Notification AVP from the network element of the bearer network, in which case, the Device-Notification AVP contains a Request-Status AVP.

In such case, the Device-Action-Answer instruction is sent after the network element of the bearer network sends a triggering request message to a triggered device according to the Device-Action-Request instruction.

Preferably, the second receiving unit 210 is further configured to, after the Device-Action-Request instruction containing the Device-Action AVP is sent to the network element of the bearer network, receive a Device-Notification request instruction containing the Device-Notification AVP from the network element of the bearer network, in which case, the Device-Notification AVP contains a Delivery-Outcome AVP.

In such case, the Device-Notification request instruction is sent by the network element of the bearer network according to a triggering response fed back by the triggered device.

In addition, the second receiving unit 210 is further configured to, after the Device-Notification request instruction sent by the network element of the bearer network is received, set the Device-Notification AVP according to the Device-Notification request instruction, in which case, the Device-Notification AVP contains a Receipt-Outcome AVP.

The second sending unit 230 is further used to send the Device-Notification AVP to the network element of the bearer network through a Device-Notification-Answer instruction.

The M2M node of the present embodiment provides physical hardware support for the device triggering message processing method of the embodiment 2, and can be used to implement any technical solution in the embodiment 2. As such, the advantages of avoiding disorder in device triggering, favourably increasing the degree of satisfaction of a user and the like are also achieved.

Embodiment 6

Figure 7:
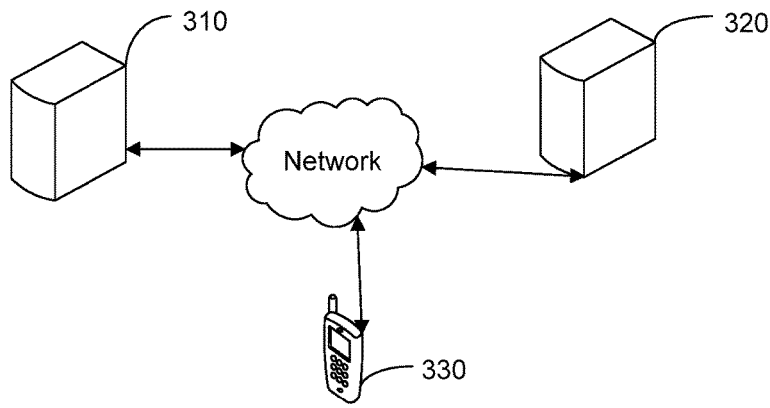
FIG. 7 is a first schematic diagram of a structure of an M2M communication system according to an embodiment 4 of the disclosure.

As shown in FIG. 7, the embodiment provides an M2M communication system, which includes an M2M node and a network element 310 of a bearer network. The M2M node forms a wired or wireless connection with the network element 310 of the bearer network. The M2M node includes an M2M node 320 with a CSE. In a specific implementation process, the M2M node further includes an M2M node without a CSE.

The CSE is configured to send a device triggering authorization request and a Device-Action AVP to the network element 310 of the bearer network, and send a Device-Action-Request instruction containing the Device-Action AVP to the network element of the bearer network.

The network element 310 of the bearer network is configured to receive the device triggering authorization request. The network element of the bearer network sends a device triggering authorization permission to the CSE according to the device triggering authorization request, receives the Device-Action-Request instruction, performs authorization checking on the CSE according to the Device-Action-Request instruction, acquires an internal identifier and routing information of a triggered device and sends a triggering request message to the triggered device 330 according to the internal identifier and the routing information.

In such case, the network element 310 of the bearer network, the M2M node 320 including the CSE. And the triggered device 330 can form network connections with each other through the bearer network. In addition, the bearer network can be a wired network or a wireless network or a hybrid network of a wired network and a wireless network.

The M2M communication system of the embodiment provides physical hardware support for the device triggering message processing method of the embodiment 3, and can implement any technical solution in the embodiment 3, As such, the advantages of avoiding disorder in device triggering and favourably increasing the degree of satisfaction of a user are also achieved.

Preferably, the network element 310 of the bearer network is further configured to, after the network element of the bearer network sends the triggering request message to the triggered device according to the internal identifier and the routing information, set a Device-Notification AVP containing a Request-Status AVP, and send a Device-Action-Answer instruction containing the Device-Notification AVP to the CSE.

The CSE is further configured to receive the Device-Action-Answer instruction.

Furthermore, the network element 310 of the bearer network is configured to, after sending the Device-Action-Answer instruction containing the Device-Notification AVP to the CSE, receive a triggering response sent by the triggered device according to the triggering request message, set the Device-Notification AVP containing a Delivery-Outcome AVP according to the triggering response, and send a Device-Notification request instruction containing the Device-Notification AVP to the CSE.

The CSE is further configured to receive the Device-Notification request instruction, set the Device-Notification AVP containing a Receipt-Outcome AVP according to the Device-Notification request instruction, and send the Device-Notification AVP through a Device-Notification-Answer instruction.

The network element 310 of the bearer network is further configured to receive the Device-Notification-Answer instruction and release the Device-Notification AVP and the Device-Action AVP according to the Device-Notification-Answer instruction.

Figure 8:
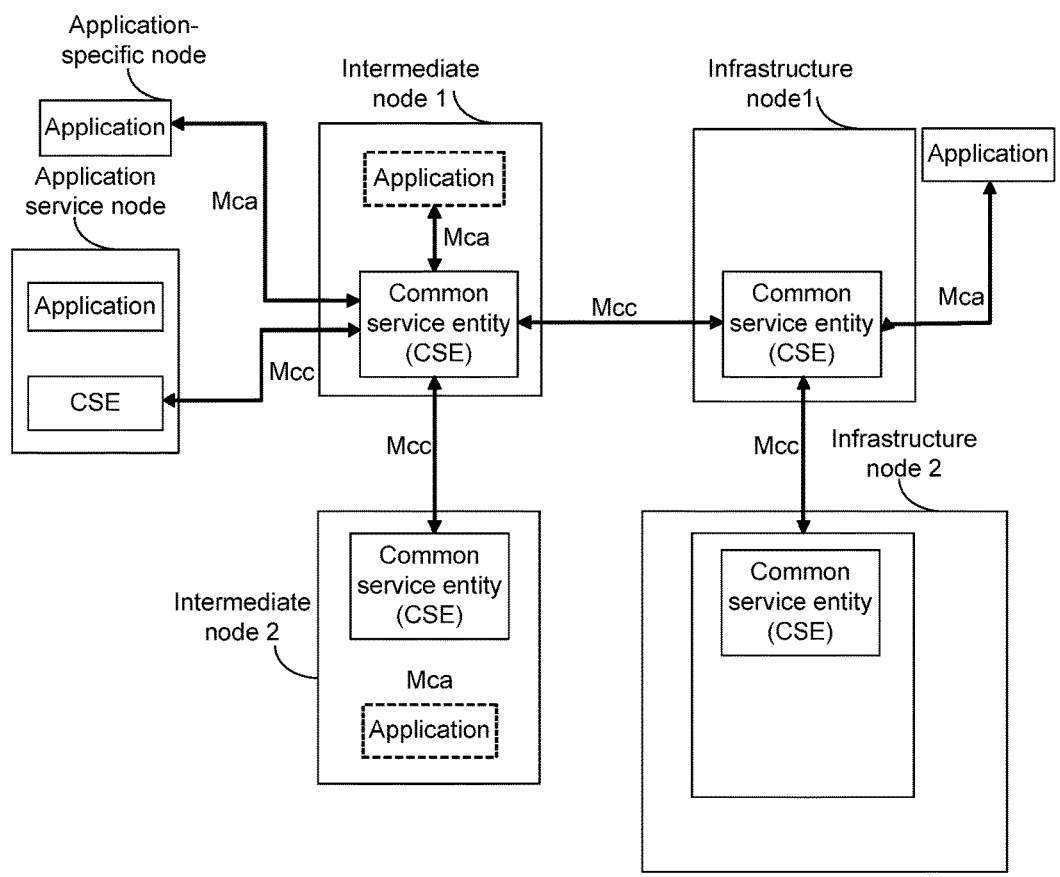
FIG. 8 is a second schematic diagram of a structure of an M2M communication system according to an embodiment 4 of the disclosure.

FIG. 8 is a schematic diagram of a structure of an example of an M2M communication system. In such case, the M2M communication system includes infrastructure node 1, infrastructure node 2, an application-specific node, an application service node, intermediate node 1 and intermediate node 2. In such case, the nodes are connected through communication interfaces, such as Mca interfaces or Mcc interfaces. Each of intermediate node 1, intermediate node 2, the application service node, infrastructure node 1 and infrastructure node 2 contains a CSE, and can function as a CSE to interact with a network element of a bearer network. In such case, the application in FIG. 8 is a specific function application, such as an information collection application.

Two specific application examples will be provided on the basis of the abovementioned embodiments, specifically as follows.

Example 1

The device triggering message processing method of the present embodiment includes the following steps.

Step 1: when a CSE is intended to send data to a specific application, if the CSE does not establish a connection with the specific application, the CSE is required to send a triggering message to physical device where the specific application is located through a bearer network.

Step 2: the CSE sends a device triggering authorization request containing an identifier of the CSE to an MTC-IWF.

Step 3: the MTC-IWF queries locally cached authorization data for a device triggering authorization permission for the CSE, and sends a device triggering authorization response containing the device triggering authorization permission to the CSE.

Step 4: the CSE sets a Device-Action AVP, and sends a setting outcome to the MTC-IWF through a Device-Action-Request instruction. The Device-Action-Request instruction can specifically contain the following contents:

1) an Action-Type AVP which is set to be a device triggering request;
2) an MSISDN AVP or an External-Id AVP which is set to be an identifier of a triggered device;
3) a CSE identifier AVP containing the identifier of the CSE requesting for device triggering;
4) a Reference-Number AVP containing a Device-Action Reference-Number newly allocated to the device triggering request by the CSE;

5) a Payload AVP containing a Trigger-Data AVP which is sent to the triggered device by the MTC-IWF through a device triggering request message;

6) a Priority-Indication AVP containing a priority of the triggering request message;

7) an Application-Port-Identifier AVP containing an indication of a triggered application in the triggered device; and 8) a Validity-Time AVP indicating a Validity-Time of the device triggering request from the time when the MTC-IWF receives the device triggering request.

Step 5: the MTC-IWF retrieves locally cached routing information for an internal identifier and routing information of the triggered device after performing authorization checking on the CSE, and sends the device triggering request message to the triggered device. In such case, the request message contains: the MSISDN or External-Id of the triggered device, the internal identifier of the triggered device, the triggering Reference-Number, the identifier of the CSE, the triggering Payload, the routing information, the Validity-Time, the priority and an Application-Port-Identifier.

Step 6: the MTC-IWF sets a Device-Notification AVP, and sends a Device-Notification AVP to the CSE through a Device-Notification-Request instruction. The Device-Notification-Request instruction contains:

1) the Action-Type AVP which is set to be a sending report;

2) the MSISDN AVP or the External-Id AVP which is set to be the identifier of the triggered device;

3) the CSE identifier AVP, the CSE identifier AVP containing the identifier of the CSE requesting for device triggering;

4) the Reference-Number AVP containing a Reference-Number in a corresponding Device-Action-Request received from the CSE; and 5) a Delivery-Outcome AVP which is set according to a Delivery-Outcome of the device triggering request message.

Step 6 specifically includes Step 6.1 to Step 6.3.

Step 6.1: if a delivery status indication contained in a triggering response of the device triggering request received by the MTC-IWF is "success", the MTC-IWF sets a Delivery-Outcome AVP to "success", and sends a Device-Notification-Request to the CSE.

Step 6.2: if the delivery status indication contained in the triggering response of the device triggering request received by the MTC-IWF is failed, the MTC-IWF sets the Delivery-Outcome AVP to "failed and reason for failure". On another aspect, the MTC-IWF sends a subscriber information request to an HSS to request for the routing information of the triggered device, in which case, the request contains the internal identifier of the triggered device, such as an International Mobile Subscriber Identity (IMSI). The HSS retrieves locally stored device subscriber information for the routing information of the triggered device, such as an identifier of a serving node, according to the internal identifier of the triggered device, and feeds back the routing information to the MTC-IWF through a subscriber information response. And the MTC-IWF resends the device triggering request according to the acquired routing information of the triggered device. If not receiving the triggering response, in which the delivery status indication is "success", of the device triggering request within the Validity-Time of the device triggering request, the MTC-IWF sends the Device-Notification-Request to the CSE.

Step 6.3: if the MTC-IWF does not receive the triggering response of the device triggering request when the Validity-Time of the device triggering request has elapsed, the MTC-IWF sets the Delivery-Outcome AVP to "unconfirmed", and sends the Device-Notification-Request to the CSE.

Step 7: the CSE sets a Device-Notification AVP according to a Delivery-Outcome in the Device-Notification-Request, and sends the Device-Notification AVP to the MTC-IWF through a Device-Notification-Answer instruction to notify the MTC-IWF that the Device-Notification-Request has been received. The instruction contains:

1) the Action-Type AVP which is set to be a sending report;

2) the Reference-Number AVP containing the Device-Action Reference-Number received from the CSE and allocated to the device triggering request by the CSE; and 3) a Receipt-Outcome AVP which is set to "success".

The instruction can further contain the following optional AVPs:

1) the MSISDN AVP or the External-Id AVP which is set to be the identifier of the triggered device; and 2) the CSE identifier AVP containing the identifier of the CSE requesting for device triggering.

Step 8: the MTC-IWF releases the Device-Notification AVP and Device-Action AVP related to the device triggering request according to a Receipt-Outcome in a device triggering report.

In addition the method can further include Step S between Step 5 and Step 6:

Step S: the MTC-IWF sets the Device-Notification AVP, and sends the Device-Notification AVP to the CSE through a Device-Action-Answer instruction to confirm that the device triggering request has been received and sent to the triggered device by the MTC-IWF. The instruction contains:

1) the Action-Type AVP which is set to be the device triggering request;

2) the Reference-Number AVP containing the Device-Action Reference-Number received from the CSE and allocated to the device triggering request by the CSE; and 3) a Request-Status AVP which is set to be a status of the device triggering request.

The instruction can further contain the following optional AVPs:

1) the MSISDN AVP or the External-Id AVP which is set to be the identifier of the triggered device; and 2) the CSE identifier AVP containing the identifier of the CSE requesting for device triggering.

Example 2

The equipment triggering message processing method of the present embodiment includes the following steps.

Step S1: an AE sends a device triggering request to a CSE.

Step S2: the CSE sends a device triggering authorization request to an MTC-IWF, in which case, the request contains an identifier of the CSE.

Step S3: the MTC-IWF sends a subscriber information request to an HSS to request for a device triggering authorization permission of the CSE, in which case, the request contains the identifier of the CSE.

Step S4: the HSS retrieves locally stored service subscriber information for the device triggering authorization permission of the CSE, and feeds back the device triggering authorization permission of the CSE to the MTC-IWF through a subscriber information response.

Step S5: the MTC-IWF sends a device triggering authorization response to the CSE, in which case, the response contains the device triggering authorization permission.

Step S6: the CSE sets a Device-Action AVP, and sends the Device-Action AVP to the MTC-IWF through a Device-Action-Request instruction. The instruction contains:

1) an Action-Type AVP which is set to be a device triggering request;

2) an MSISDN AVP or an External-Id AVP which is set to be an identifier of a triggered device;

3) a CSE identifier AVP containing the identifier of the CSE requesting for device triggering;

4) a Reference-Number AVP containing a new Device-Action Reference-Number allocated to the device triggering request by the CSE;

5) a Payload AVP containing a Trigger-Data AVP which is sent to the triggered device by the MTC-IWF through a device triggering request message;

6) a Priority-Indication AVP containing a priority of the triggering request message;

7) an Application-Port-Identifier AVP containing an indication of a triggered application in the triggered device; and 8) a Validity-Time AVP indicating a Validity-Time of the device triggering request from the time when the MTC-IWF receives the device triggering request.

Step S7: the MTC-IWF sends a subscriber information request to the HSS to request for an internal identifier and routing information of the triggered device after performing authorization checking on the CSE, in which case, the request contains the identifier of the triggered device.

Step S8: the HSS retrieves locally stored device subscriber information for the internal identifier such as an IMSI of the triggered device, and the routing information of the triggered device, such as an identifier of a serving node, and feeds back the internal identifier and the routing information to the MTC-IWF through a subscriber information response.

Step S9: the MTC-IWF sends the device triggering request message to the triggered device, in which case, the request message contains:

an MSISDN or External-Id of the triggered device, the internal identifier of the triggered device, the triggering Reference-Number, the identifier of the CSE, the triggering Payload, the routing information, the Validity-Time, the priority and an Application-Port-Identifier.

Step S10: the MTC-IWF sets a Device-Notification AVP, and sends the Device-Notification AVP to the CSE through a Device-Notification-Request instruction. The instruction contains:

1) the Action-Type AVP set to be a sending report;

2) the MSISDN AVP or External-Id AVP set to be the identifier of the triggered device;

3) the CSE identifier AVP containing the identifier of the CSE requesting for device triggering;

4) the Reference-Number AVP containing a Reference-Number in a corresponding Device-Action-Request received by the CSE; and 5) a Delivery-Outcome AVP which is set according to a Delivery-Outcome of the device triggering request message, containing the following situations:

10.1: if a delivery status indication contained in a triggering response of the device triggering request received by the MTC-IWF is "success", the MTC-IWF sets a Delivery-Outcome AVP to "success", and sends a Device-Notification-Request to the CSE.

10.2: if the delivery status indication in the triggering response of the device triggering request received by the MTC-IWF is "failed", the MTC-IWF sets the Delivery-Outcome AVP to "failed and reason for failure". On another aspect, the MTC-IWF resends the subscriber information request to the HSS to request for the routing information of the triggered device again, in which case, the request message contains the internal identifier such as the IMSI of the triggered device, and the reason for failure. The HSS retrieves the locally stored device subscriber information for the routing information of the triggered device, such as an identifier of a serving node, according to the internal identifier of the triggered device, and feeds back the routing information to the MTC-IWF through a subscriber information response, and meanwhile, the HSS updates the device subscriber information according to the reason for failure. And the MTC-IWF resends the device triggering request according to the acquired routing information of the triggered device. If not receiving the triggering response, in which the delivery status indication is "success", of the device triggering request within the Validity-Time of the device triggering request, the MTC-IWF sends the Device-Notification-Request to the CSE.

10.3: if the MTC-IWF does not receive the triggering response of the device triggering request when the Validity-Time of the device triggering request has elapsed, the MTC-IWF sets the Delivery-Outcome AVP to "unconfirmed", and sends the Device-Notification-Request to the CSE.

Step S11: the CSE sets the Device-Notification AVP according to the Delivery-Outcome in the Device-Notification-Request, and sends the Device-Notification AVP to the MTC-IWF through a Device-Notification-Answer instruction to notify the MTC-IWF that the Device-Notification-Request has been received. The instruction contains:

1) the Action-Type AVP which is set to be a sending report;

2) the Reference-Number AVP containing the Device-Action Reference-Number received from the CSE and allocated to the device triggering request by the CSE; and 3) a Receipt-Outcome AVP which is set to "success".

The instruction can further contain the following optional AVPs:

1) the MSISDN AVP or the External-Id AV which is set to be the identifier of the triggered device; and 2) the CSE identifier AVP containing the identifier of the CSE requesting for device triggering.

On another aspect, the CSE sends a notification message to the AE.

Step S12: the MTC-IWF releases the Device-Notification AVP and Device-Action AVP related to the device triggering request according to a Receipt-Outcome in a device triggering report.

In addition, the method can further include Step SS between Step S9 and Step S10:

Step SS: the MTC-IWF sets the Device-Notification AVP, and sends the Device-Notification AVP to the CSE through a Device-Action-Answer instruction to confirm that the device triggering request has been received and sent to the triggered device by the MTC-IWF. The instruction contains:

1) the Action-Type AVP which is set to be the device triggering request;

2) the Reference-Number AVP containing the Device-Action Reference-Number received from the CSE and allocated to the device triggering request by the CSE; and 3) a Request-Status AVP which is set to be a status of the device triggering request.

The instruction can further contain the following optional AVPs:

1) the MSISDN AVP or the External-Id AVP which is set to be the identifier of the triggered device; and 2) the CSE identifier AVP containing the identifier of the CSE requesting for device triggering.

The embodiment of the disclosure further provides a computer storage medium having stored therein computer-executable instructions for executing the method of any technical solution in the embodiment 1.

The embodiment of the disclosure further provides another computer storage medium having stored therein computer-executable instructions for executing the method of any technical solution in the embodiment 2.

The embodiment of the disclosure further provides another computer storage medium having stored therein computer-executable instructions for executing the method of any technical solution in the embodiment 3.

From the embodiments provided by the disclosure, it should be understood that the disclosed device and method can be implemented in other forms. The device embodiment described above is only schematic, and for example, division of the units is only division in terms of logical function, and other division manners can be adopted during practical implementation. For example, a plurality of units or components can be combined or integrated into another system, or some feature can be omitted or not performed. In addition, coupling or direct coupling or communication connection between the respective shown or discussed components can be indirect coupling or communication connection implemented through some interfaces, devices or units, or electrically and mechanically or in other forms.

The units described as separate parts may or may not be physically separated, and parts shown as units may or may not be physical units, and namely can be located in the same place, or can also be distributed to a plurality of network units. Part or all of the units can be selected to achieve the purpose of the solutions of the embodiment according to a practical requirement.

In addition, the respective function units in each embodiment of the disclosure can be integrated into a processing module, the respective units can exist independently, or two or more units can be integrated into a unit. The integrated unit can be implemented in a hardware form, and can also be implemented in form of combining hardware and software function unit.

Those skilled in the art should understand that: all or part of the steps of the method embodiment can be implemented by hardware related to program instructions, the program can be stored in a computer-readable storage medium. And the program is executed to perform the steps of the method embodiment. The storage medium includes: various medium capable of storing program codes, such as mobile storage equipment, a ROM, a RAM, a magnetic disk or a compact disc.

The above is only the preferred embodiment of the disclosure and not intended to limit the scope of protection of the disclosure. It should be understood that any modifications made according to the principle of the disclosure shall fall within the scope of protection of the disclosure.

What is claimed is:

1. A device triggering message processing method, comprising:
    receiving a device triggering authorization request which contains an identifier of a Common Service Entity (CSE) and is sent by the CSE;
    sending a device triggering authorization permission to the CSE according to the device triggering authorization request;
    receiving a Device-Action-Request instruction which contains a Device-Action Attribute Value Pair (AVP) and is set and sent by the CSE;
    performing authorization checking on the CSE according to the Device-Action-Request instruction, and acquiring an internal identifier and routing information of a triggered device;
    sending a triggering request message to the triggered device according to the internal identifier and the routing information;
    setting a Device-Notification AVP containing a Request-Status AVP, wherein the Request-Status AVP is used to indicate a status of the triggering request message; and
    sending a Device-Action-Answer instruction containing the Device-Notification AVP to the CSE.

2. The method according to claim 1, after the step of sending the Device-Action-Answer instruction containing the Device-Notification AVP to the CSE, the method further comprising:
    receiving a triggering response which is sent by the triggered device according to the triggering request message;
    setting the Device-Notification AVP containing a Delivery-Outcome AVP according to the triggering response; and
    sending a Device-Notification request instruction containing the Device-Notification AVP to the CSE.

3. The method according to claim 2, wherein the step of setting the Device-Notification AVP according to the triggering response comprises:
    receiving the triggering response from the triggered device within a triggering Validity-Time; and
    setting the Delivery-Outcome AVP to "unconfirmed" if the triggering response is not received within the triggering Validity-Time.

4. The method according to claim 3, wherein the step of setting the Device-Notification AVP according to the triggering response further comprises:
    setting the Delivery-Outcome AVP to "success" if the triggering response is received within the triggering Validity-Time and a delivery status indication in the triggering response is "triggering succeeded".

5. The method according to claim 4, wherein the step of setting the Device-Notification AVP according to the triggering response further comprises:
    resending the triggering request message until triggering succeeds or the triggering Validity-Time has elapsed, if the triggering response is received within the triggering Validity-Time and the delivery status indication in the triggering response is "triggering failed"; and
    setting the Delivery-Outcome AVP to "failed" when the triggering Validity-Time has elapsed and triggering fails,
    wherein the Device-Notification AVP further contains a reason for failure.

6. The method according to claim 2, after the step of sending the Device-Notification request instruction containing the Device-Notification AVP to the CSE, the method further comprising:
    receiving a Device-Notification-Answer instruction sent by the CSE,
    wherein the Device-Notification-Answer instruction contains the Device-Notification AVP which is set by the CSE according to the Device-Notification request instruction; and the Device-Notification AVP contains a Receipt-Outcome AVP.

7. The method according to claim 6, after the step of receiving the Device-Notification-Answer instruction sent by the CSE, the method further comprising:

releasing the Device-Action AVP and the Device-Notification AVP according to the Device-Notification-Answer instruction.

8. A non-transitory computer storage medium having stored therein computer-executable instructions for executing the method according to claim 1.

9. A device triggering message processing method, comprising:

sending a device triggering authorization request containing an identifier of a Common Service Entity (CSE);

receiving a device triggering authorization permission fed back by a network element of a bearer network according to the device triggering authorization request;

setting a Device-Action Attribute Value Pair (AVP);

sending a Device-Action-Request instruction containing the Device-Action AVP to the network element of the bearer network; and receiving a Device-Action-Answer instruction containing a Device-Notification AVP sent by the network element of the bearer network, the Device-Notification AVP containing a Request-Status AVP, wherein the Request-Status AVP is used to indicate a status of a triggering request message, wherein the Device-Action-Answer instruction is sent after the network element of the bearer network sends the triggering request message to a triggered device according to the Device-Action-Request instruction.

10. The method according to claim 9, after the step of sending the Device-Action-Request instruction containing the Device-Action AVP to the network element of the bearer network, the method further comprising:

receiving a Device-Notification request instruction which contains the Device-Notification AVP and is sent by the network element of the bearer network, the Device-Notification AVP containing a Delivery-Outcome AVP, wherein the Device-Notification request instruction is sent by the network element of the bearer network according to a triggering response fed back by the triggered device.

11. The method according to claim 10, after the step of receiving the Device-Notification request instruction sent by the network element of the bearer network, the method further comprising:

setting the Device-Notification AVP containing a Receipt-Outcome AVP according to the Device-Notification request instruction; and sending the Device-Notification AVP to the network element of the bearer network through a Device-Notification-Answer instruction.

12. A non-transitory computer storage medium having stored therein computer-executable instructions for executing the method according to claim 9.

13. A network element of a bearer network, comprising:

one or more processors executing computer readable instructions to implement a plurality of modules, the plurality of modules comprising a first receiving unit, a first processing unit and a first sending unit, wherein the first receiving unit is configured to receive a device triggering authorization request which contains an identifier of a Common Service Entity (CSE) and is sent by the CSE;

the first processing unit is configured to send a device triggering authorization permission to the CSE according to the device triggering authorization request;

the first receiving unit is further configured to receive a Device-Action-Request instruction which contains a Device-Action Attribute Value Pair (AVP) and is set and sent by the CSE;

the first processing unit is further configured to perform authorization checking on the CSE according to the Device-Action-Request instruction, and acquire an internal identifier and routing information of a triggered device;

the first sending unit is configured to send a triggering request message to the triggered device according to the internal identifier and the routing information;

the first processing unit is further configured to, after the triggering request message is sent to the triggered device according to the internal identifier and the routing information, set a Device-Notification AVP, wherein the Device-Notification AVP contains a Request-Status AVP, wherein the Request-Status AVP is used to indicate a status of the triggering request message; and the first sending unit is further configured to send a Device-Action-Answer instruction containing the Device-Notification AVP to the CSE.

14. The network element of the bearer network according to claim 13, wherein the first receiving unit is further configured to, after the Device-Action-Answer instruction containing the Device-Notification AVP is sent to the CSE, receive a triggering response, which is sent by the triggered device according to the triggering request message;

the first processing unit is further configured to set the Device-Notification AVP containing a Delivery-Outcome AVP according to the triggering response; and the first sending unit is further configured to send a Device-Notification request instruction containing the Device-Notification AVP to the CSE.

15. The network element of the bearer network according to claim 14, wherein the first receiving unit is further configured to receive the triggering response from the triggered device within a triggering Validity-Time; and the first processing unit is configured to set the Delivery-Outcome AVP to "unconfirmed" if the triggering response is not received within the triggering Validity-Time.

16. The network element of the bearer network according to claim 15, wherein the first processing unit is further configured to set the Delivery-Outcome AVP to "success" if the triggering response is received within the triggering Validity-Time and a delivery status indication in the triggering response is "triggering succeeded".

17. The network element of the bearer network according to claim 16, wherein the first processing unit is further configured to resend the triggering request message until triggering succeeds or the triggering Validity-Time has elapsed, if the triggering response is received within the triggering Validity-Time and the delivery status indication in the triggering response is "triggering failed"; and set the Delivery-Outcome AVP to "failed" when the triggering Validity-Time has elapsed and triggering fails, wherein the Device-Notification AVP further contains a reason for failure.

* * * * *